UNITED STATES PATENT OFFICE.

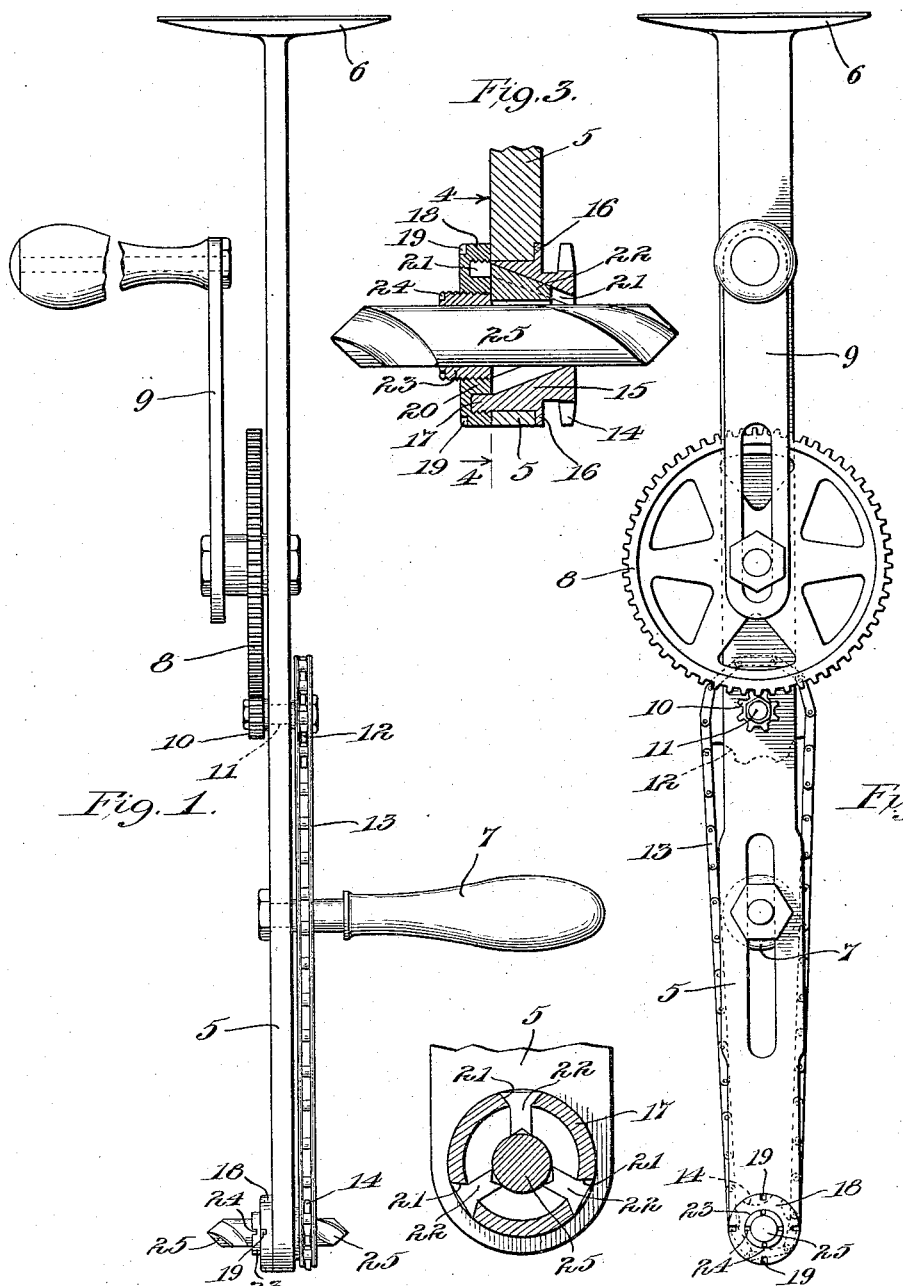

ERIK H. LARSON, OF CHICAGO, ILLINOIS.

DRILL.

1,174,740.

Specification of Letters Patent.

Patented Mar. 7, 1916.

Application filed August 2, 1915. Serial No. 43,304.

*To all whom it may concern:*

Be it known that I, ERIK H. LARSON, a subject of the King of Sweden, and a resident of the city of Chicago, county of Cook, and State of Illinois, have invented certain new and useful Improvements in Drills, of which the following is a specification.

My invention relates to improvements in drills and has for its object the production of an improved hand drill adapted to drill lateral holes.

The invention consists in the combination and arrangement of parts hereinafter described and claimed.

The invention will be best understood by reference to the accompanying drawing, forming a part of this specification, and in which—

Figure 1 is a side view of a drill embodying my invention, Fig. 2, a face view of the same, Fig. 3, an enlarged transverse section through a drill chuck employed in the construction, and Fig. 4, a section taken on line 4—4 of Fig. 3.

The preferred form of construction as illustrated in the drawing comprises a handle member 5 having a breastplate 6 at one end and a longitudinally adjustable handle 7 adjacent its other end. A driving gear 8 is rotatably mounted on handle member 5 and is provided with an adjustable crank handle 9 for rotating the same. Gear 8 meshes with a pinion 10 on a shaft 11 passing through handle member 5 and carrying a sprocket wheel 12 at its other end. Sprocket wheel 12 is connected by means of a sprocket chain 13 with a sprocket wheel 14 formed at one end of a chuck head 15 rotatably mounted in a transverse perforation in the extreme end of handle member 5. Chuck head 15 is provided at one side with a flange 16 contacting with the corresponding side of handle member 5 and at its other side with an externally threaded annular flange 17 protruding from said handle member. A cap 18 is threaded on flange 17 to contact with the corresponding side of handle member 5 being provided with notches 19 for the reception of a spanner wrench by means of which said cap may be tightened to position to effect a simple and efficient rotatable connection between the chuck head 15 and handle member 5. Cap 18 is also provided with an inwardly extending flange 20 extending within flange 17 as indicated. The chuck head 15 is provided with three inwardly inclined wedging dovetail slots 21 and three wedging chuck jaws 22 are slidably mounted in said slots as indicated. A bushing or sleeve 23 is threaded in cap 18 and flange 20 and is positioned to bear against the corresponding ends of chuck jaws 22, said bushing being provided at its outer end with notches 24 for the reception of a spanner wrench for manipulating the same. A drill 25 pointed at both ends is passed through chuck head 15 and secured therein by means of chuck jaws 22 operated by sleeve 23 as will be readily understood. The construction is such that the same is durable and reliable in use and capable of economical manufacture. The specific form and arrangement of the parts constitute a simple and effective one for the purpose and is capable of ready assembling or taking apart.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention what I claim as new and desire to secure by Letters Patent is:

A drill comprising a handle member provided at one end with a transverse perforation; an axially perforated chuck head rotatably mounted in said perforation, said chuck head being provided on one side with a flange engaging one side of said handle member and on its other end with an externally threaded flange projecting from the other side of said handle member; an internally threaded cap engaging said flange and said other side of said handle member; wedging chuck jaws slidably mounted in said chuck head to engage a drill passing therethrough; a bushing threaded in said cap and arranged to operate said chuck jaws; a sprocket wheel on said chuck head; and a sprocket chain connection for driving said sprocket wheel, substantially as described.

In testimony whereof I have signed my name to this specification in the presence of two subscribing witnesses.

ERIK H. LARSON.

Witnesses:
JOSHUA R. H. POTTS,
CORA F. SCHIEBER.